United States Patent Office 3,541,170
Patented Nov. 17, 1970

3,541,170
PREPARATION OF TETRAPHENYLENE AND DERIVATIVES
Lester Friedman, Beechwood, Ohio, and Donald F. Lindow, Snyder, N.Y., assignors to Case Western Reserve University, a corporation of Ohio
No Drawing. Filed Mar. 1, 1968, Ser. No. 709,788
Int. Cl. C07c 15/12
U.S. Cl. 260—668                                 2 Claims

ABSTRACT OF THE DISCLOSURE

According to this invention biphenylene is dimerized to tetraphenylene by pyrolyzing it in a non-oxidizing atmosphere at a temperature in the range of 250° to 460° C. for a period of time up to 30 hours.

---

This invention relates to the preparation of polycyclic hydrocarbons.

Tetraphenylene has been prepared previously from 2,2'-dihalobiphenyls by treatment of the corresponding di-Grignard reagent with $CuCl_2$, 16% [W. S. Rapson, R. G. Shuttleworth and J. N. van Niekerk, J. Chem. Soc., 326 (1943)] or by treatment of the corresponding dilithio compound with $CoCl_2$, 3%, or $NiCl_2$, 46% [G. Wittig and G. Lehmann, Ber., 90, 875 (1957)]. Treatment of a benzene solution of biphenylene with $Ni(CO)_2(P\phi_3)_2$ in a sealed tube at 100° is also a source of tetraphenylene, 7% [J. Chatt, R. G. Guy, and H. R. Watson, J. Chem. Soc., 2332 (1961)].

Biphenylene is conveniently prepared from anthranilic acid via benzenediazonium-2-carboxylate [L. Friedman, and A. Seitz, Organic Syntheses, in press]; or by pyrolysis of phthalic anhydride [M. P. Cava, M. J. Mitchell, D. C. De Jongh, and R. Y. Van Fossen, Tetrahedron Letters, 2947 (1966)].

In general the yield of desired dimer depends upon the conditions employed in the pyrolysis. Thus, use of temperatures in the range of 390° to 450° C. at reaction times of up to 20 hours are most favorable for the formation of tetraphenylene. Use of lower temperatures of the order of 300° to 350° C. even of short reaction times of up to 6 hours results in a marked sacrifice in the yield of desired tetraphenylene with the concurrent increase of polymeric material.

Table I is a summary of a series of tests conducted in evacuated sealed tubes and show effect of temperature and time on yield of tetraphenylene. The tubes were such as sold under the trade name "Vycor" by Corning Glass Company consisting of quartz having 96% silica.

TABLE I

| Temp., °C. | Time, hrs. | Percent Tetraphenylene [1] | Biphenyl [1] | Biphenylene [1] |
|---|---|---|---|---|
| 395–408 | 1.0 | 96 | 4 | 0 |
| 430–445 | 0.5 | 85 | 3 | 0 |
| 430–445 | 18.0 | 66 | 5 | 0 |
| 330–350 | 1 | 5 | 0 | 95 |
| 330–350 [2] | 6 | 11 | 1 | 76 |
| 330–350 [2] | 30 | 11 | 6 | 17 |
| 330–350 [3] | 30 | 95 | 1 | 2 |

[1] Percent yield based on the initial amount of biphenylene.
[2] Balance of material is polymeric.
[3] Reaction tube contained a 14 mm. piece of ⅙ in. 304 stainless steel tubing. 304 stainless steel has the reported composition in percent: Carbon, .08 (maximum); manganese, 2 (maximum); phosphorus, .045 (maximum); sulfur, .03 (maximum); silicon, 1.0 (maximum); chromium, 18–20; and nickel, 8–12.

From the above results it is apparent that in 1 hour at 330° to 350° C. there is only a very slight conversion of biphenylene, extending the time to 30 hours results in considerable conversion of biphenylene but with no increase in yield of tetraphenylene, and the use of a catalyst such as the stainless steel mentioned, results in increased conversion to tetraphenylene at 330–350° C. The pyrolysis of the biphenylene in accord with this invention is effected in the liquid phase in the presence or absence of such diluents as anthracene, benzene, etc., or catalyst such as stainless steel.

The process of this invention provides an efficient and direct means for producing tetraphenylene and tetraphenylene derivatives in good yield. Pyrolysis of substituted biphenylene, e.g.: 1- and 2-chlorobiphenylene, 2-methyl biphenylene, 2-carbomethoxy biphenylene give respectively, an isomeric mixture of dichlorotetraphenylene, dimethyl tetraphenylene, and bis(carbomethoxy) tetraphenylene.

Tetraphenylene is more thermally stable than other aromatic hydrocarbons of the same order of molecular weight and is useful as a heat-transfer medium, particularly in the temperature range between 233° and 400° C. and above being resistant to gamma radiation in nuclear reactors.

EXAMPLE 1

Preparation of tetraphenylene

Biphenylene (20 g.) was placed in a 40 ml. 304 stainless steel bomb. The bomb was filled with nitrogen after first removing the air by alternate evacuation and purging with nitrogen. By using a small furnace the bomb was heated to between 354° and 375° and maintained at that temperature for 1 hour. Crude tetraphenylene was recrystallized from acetone and dried under vacuum (water aspirator) at 110° (toluene) to remove the 0.5 mole of acetone of crystallization. This afforded 18 g. (90%) of powdered, white tetraphenylene (M.P. 232–233° cor.). Higher reaction temperatures result in decreased yields of poorer quality material which may be purified by chromatography on alumina.

EXAMPLE 2

Polymeric material

Biphenylene 2 g.) will pyrolyze in an evacuated Vycor tube at 330–350° C. for 30 hours. The reaction mixture was found to contain the following volatile products:

|  | Percent |
|---|---|
| Tetraphenylene | 11 |
| Biphenyl and | 6 |
| Unreacted biphenylene | 17 |

The low melting, non-volatile, easily soluble residue, approximately 65%, was the main product. Spectral data indicate that it is probably an orthopolyphenylene.

EXAMPLE 3

Dichlorotetraphenylene

Five grams of 2-chlorobiphenylene was pyrolyzed under conditions described in Example 1. The crude product was recrystallized from acetone and dried in vacuo at 110° C. to remove the acetone of crystallization. 4.5 g. of a mixture of isomeric dichlorotetraphenylene was obtained.

What is claimed is:
1. A method of preparing a product selected from the group consisting of tetraphenylene and substituted tetra- phenylenes which comprises pyrolizing a substance selected from the group consisting of biphenylene and substituted biphenylenes in a non-oxidizing atmosphere at a temperature of 450° C.

2. The method of preparing the product described in claim 1 undert he condition described in claim 1 in the presence of stainless steel as a catalyst.

No references cited.

DELBERT E. GANTZ, Primary Examiner

C. R. DAVIS, Assistant Examiner

U.S. Cl. X.R.

260—670